US012340352B2

(12) United States Patent
Waskom et al.

(10) Patent No.: US 12,340,352 B2
(45) Date of Patent: *Jun. 24, 2025

(54) EXTENSIBLE INTERFACE FOR SYNCHRONOUS AND ASYNCHRONOUS PAYMENT (71) Applicant: Microsoft Technology Licensing, LLC, Redmond, WA (US)

(72) Inventors: Sarah Waskom, Seattle, WA (US); Cherie Kwan, Woodinville, WA (US); Dale Lemieux, Bellevue, WA (US); George Li, Redmond, WA (US); Aravind Aluri, Redmond, WA (US); Huiyong Xiao, Redmond, WA (US); Arik Cohen, Bellevue, WA (US); Joel Botner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,201

(22) Filed: Mar. 29, 2022

(65) Prior Publication Data
US 2022/0222631 A1 Jul. 14, 2022

Related U.S. Application Data (63) Continuation of application No. 15/649,059, filed on Jul. 13, 2017, now Pat. No. 11,301,822, which is a
(Continued)

(51) Int. Cl.
G06Q 30/0601 (2023.01)
G06Q 20/02 (2012.01)
(Continued)

(52) U.S. Cl.
CPC ......... *G06Q 20/027* (2013.01); *G06Q 20/356* (2013.01); *G06Q 30/0601* (2013.01); *G07F 19/211* (2013.01)

(58) Field of Classification Search
CPC . G06Q 20/027; G06Q 20/356; G06Q 30/0601
(Continued)

(56) References Cited

U.S. PATENT DOCUMENTS

2002/0087412 A1* 7/2002 Wood ..................... G06Q 50/12
705/15
2004/0148252 A1* 7/2004 Fleishman ........... G06Q 20/223
705/39

(Continued)

OTHER PUBLICATIONS

Communication pursuant to Rules 70(2) and 70a(2) EPC received for European Patent Application No. 13771338.4, mailed on Dec. 13, 2016, 1 Page.

*Primary Examiner* — Mohammad Z Shaikh
*Assistant Examiner* — Michael J Warden
(74) *Attorney, Agent, or Firm* — RAY QUINNEY & NEBEKER; Tiffany Healy (57) ABSTRACT An applications programming interface (API) or other interface may be configured for use with a plurality of e-commerce applications and/or a plurality of payment systems. The API may be associated with an operating system of a client or may be otherwise located in an e-commerce system or network. The API may receive a call regarding a purchase transaction. The purchase transaction may be examined to determine if a payment method is synchronous or asynchronous. An appropriate payment system may be activated to perform the purchase transaction based at least in part on the determination made by the examination of the purchase transaction. A result of the purchase transaction may be sent to the e-commerce program. By revision of the API, developers of e-commerce applications are freed from the burden
(Continued)

of revising code in response to the need to utilize additional or differently operated payment systems.

17 Claims, 6 Drawing Sheets

Related U.S. Application Data continuation of application No. 13/923,284, filed on Jun. 20, 2013, now abandoned.

(51) Int. Cl.
*G06Q 20/34* (2012.01)
*G07F 19/00* (2006.01)

(58) Field of Classification Search
USPC .......................................................... 705/39
See application file for complete search history.

(56) References Cited

U.S. PATENT DOCUMENTS

| | | | | |
|---|---|---|---|---|
| 2005/0228750 A1* | 10/2005 | Olliphant | ............... | G06Q 20/02 |
| | | | | 705/40 |
| 2010/0280909 A1* | 11/2010 | Zhang | ................... | G06Q 20/202 |
| | | | | 705/17 |
| 2010/0299195 A1* | 11/2010 | Nix | ........................ | G06Q 20/12 |
| | | | | 705/16 |
| 2013/0144762 A1* | 6/2013 | Nguyen | ............. | G06Q 30/0613 |
| | | | | 705/26.81 |
| 2014/0006279 A1* | 1/2014 | Salgueiro | ............... | G06Q 30/06 |
| | | | | 705/44 |
| 2017/0344961 A1* | 11/2017 | Waskom | ............ | G06Q 30/0601 |

\* cited by examiner

EXTENSIBLE INTERFACE FOR SYNCHRONOUS AND ASYNCHRONOUS PAYMENT

RELATED APPLICATION

This application is a continuation of U.S. patent application Ser. No. 15/649,059, filed on Jul. 13, 2017, which is a continuation of and claims priority to U.S. patent application Ser. No. 13/923,284, filed on Jun. 20, 2013, the disclosures of which are incorporated by reference herein.

BACKGROUND

Many payment systems are available for use by customers of online retailers. The payment systems include those that use credit cards and others that perform secure payment moving money from one party (e.g., a purchaser) to another party (e.g., a vendor). However, as more payment systems become available, differences between such systems result in difficulty for developers, and the need to change code within their e-commerce applications. One difficulty faced by developers is the need to code for both synchronous and asynchronous payment systems. Accordingly, application development and maintenance is made more difficult as the number of payment systems grows. Moreover, applications that fail to overcome such difficulties in a timely manner fail to satisfy users' expectations.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques by which an e-commerce application may make payments in a plurality of markets, using a plurality of payment systems, and/or according to a plurality of different payment methods. In one example, the techniques are performed by an interface, such as an application programming interface (API) utilized by an operating system on which an e-commerce application may be operating. The API may be made available to developers of such e-commerce applications.

The API may significantly reduce the burden on the developers of e-commerce applications, such as burdens associated with adapting to additional payment systems. In one example, periodic enhancements to the API to accommodate additional payment systems and methods may be performed, thereby avoiding the need for changes to the e-commerce applications.

The techniques provide for transactions that may be either synchronous or asynchronous. In a synchronous payment method, such as most credit card payments (e.g., those without a secondary authentication (e.g., Verified by Visa®)), the payment and title to the goods and/or services are synchronously exchanged, such as by completion of a credit card charge. Examples of credit cards include VISA®, American Express® and others. In an asynchronous payment method, such as a bank transfer, intermediate steps are required to perform the transfer. Such intermediate steps may include having the user log into a website of the asynchronous payment system and provide password(s) and/or other information. Alipay® and other payment systems that require secondary user step(s) are examples of asynchronous payment systems.

While certain aspects of synchronous credit card transactions are known, an interface that may be utilized to seamlessly perform both synchronous and asynchronous transactions and which may be expanded to utilize new e-commerce payment systems without requiring changes to e-commerce applications, has not previously been known.

In one example, when a user makes an in-application purchase using an asynchronous payment method, the e-commerce application running on a computing device may call the API. The API may be part of, or associated with, the operating system of the client device. The API may redirect the user to a webpage associated with the asynchronous payment system while leaving a modal dialog (e.g., dialog box or related graphical user interface element or object) on the application. Thus, a result is not immediately returned to the e-commerce application. This performance appears to the e-commerce application to be similar to a synchronous credit card transaction, wherein the application receives a result only when the purchase dialog closes. As the user is redirected to the webpage, the "store" with which the e-commerce application is communicating has a record of the pending purchase. Additionally, a commerce platform may also receive a record of the pending purchase. The commerce platform may comprise a plurality of servers that support transactions performed by the operating system of the computing device of the user and a plurality of e-commerce payment systems. In one example, the commerce platform handles aspects of the transaction between the e-commerce application and a vendor while the e-commerce application on the client device waits.

The user may complete entry of payment information into the webpage associated with the asynchronous payment system. Upon receipt of this information by the asynchronous payment system, the webpage is removed and the user returns to the e-commerce application. The user then selects "continue" or similar on the modal dialog box. This signals a purchase process operating on the e-commerce store to poll the commerce platform for a status of the asynchronous purchase record. The polling continues as the commerce platform works with the asynchronous payment system to resolve the payment.

The e-commerce application attempts to keep the user from leaving the purchase process until there is a success or failure of the purchase process. Upon receipt of a success or failure state, the API transmits the state to the e-commerce application. A pending state, which may represent the processing of a payment in an asynchronous payment method, is not returned by the API. Accordingly, the API may provide a consistent result to the e-commerce application for both synchronous and asynchronous transactions.

If the user leaves the transaction (e.g., turns off the user's computing device or closes the e-commerce application) a cleanup job is run to determine a final status of the transaction. If the user tries to purchase the item again, prior to the cleanup job, the commerce platform is polled to determine a current status of the purchase, which is returned to the e-commerce application.

Example System and Techniques

Figure 1:
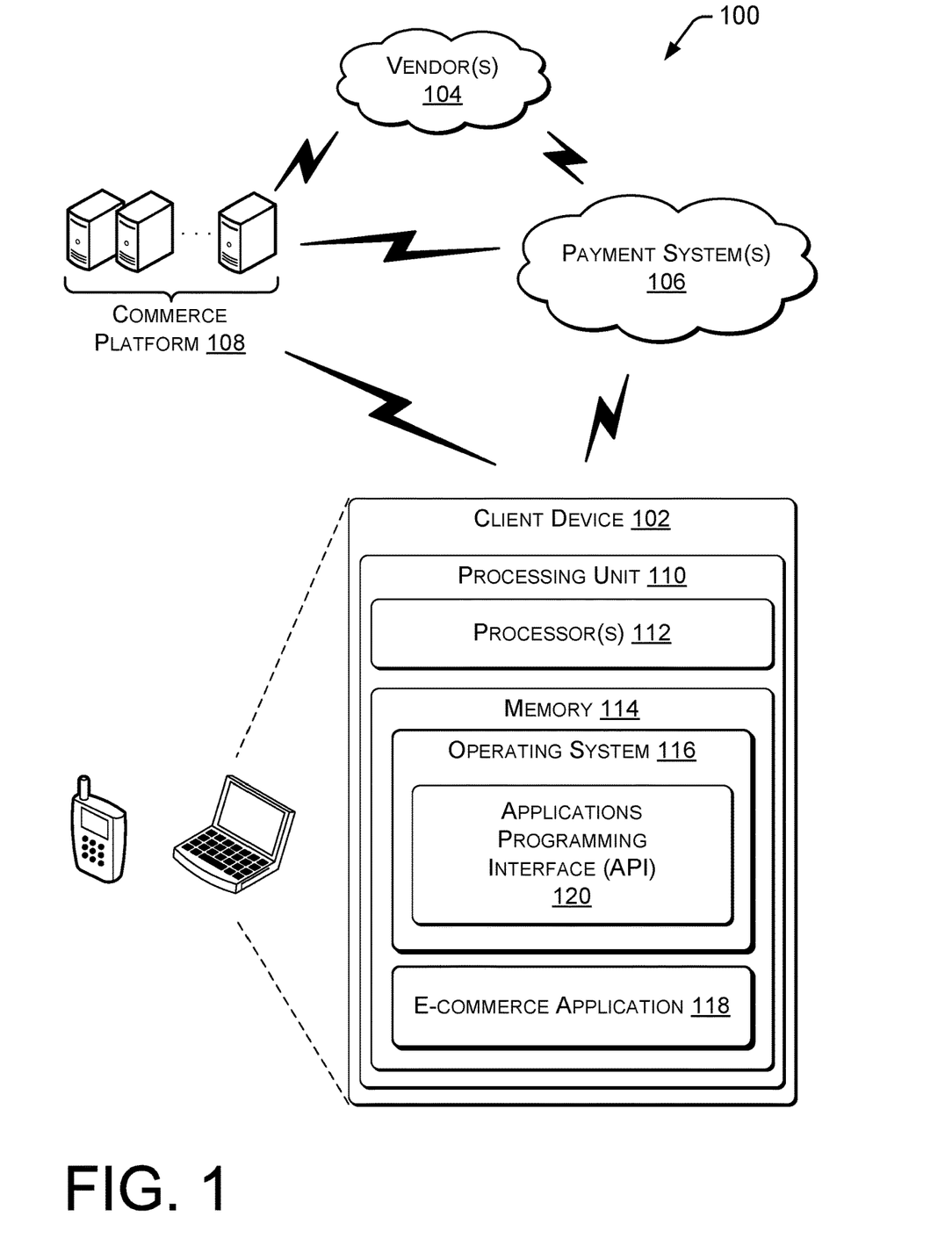
FIG. 1 is a diagram showing an example of a system for performing e-commerce payments, including example detail of a client operating an e-commerce application.

FIG. 1 is a diagram showing an example of a system 100 for performing e-commerce payments. A client device 102 may be a laptop, tablet, smart phone, or any mobile and/or desktop computing device. The client device 102 may assist a user operating the client device to purchase goods and/or services from one or more vendors 104. The purchase transaction may be performed using a payment system 106, and may be assisted by a commerce platform 108.

In the example of FIG. 1, the client device 102 may be in communication with one or more of the vendor(s) 104, payment system(s) 106 and/or commerce platform 108. The vendor(s) 104 may be any "store" or vendor configured to sell products and/or services, such as by using a website or other e-commerce techniques. Examples of such vendors include those selling books, electronics, tickets, game-level products and/or services, in-app purchases, on-line content, travel accommodations, etc. The payment system(s) 106 may be any third party (i.e., not the purchaser and not the vendor) system that is configured for performing and/or assisting in e-commerce payments. Such payments may be synchronous (i.e., using credit cards) or asynchronous (e.g., using bank transfer techniques). The client 102 may include a processing unit 110, which may include one or more processors 112 and memory 114. An operating system 116 may provide functionality to one or more applications, such as an e-commerce application 118. The e-commerce application 118 may be configured to assist the user of the client device 102 to purchase goods or services from the vendor(s) 104. To assist in purchase transactions, the e-commerce application 118 may make calls to the operating system 116, including an application programming interface (API) 120. In one example, the API 120 is configured for use with either synchronous or asynchronous payment systems. In a further example, the API 120 is configured for expansion or extension to work with a new and/or additional payment system (of synchronous or asynchronous type) without a change to an interface called by the e-commerce application 118 that would cause recoding and/or redesign of that application.

Figure 2:
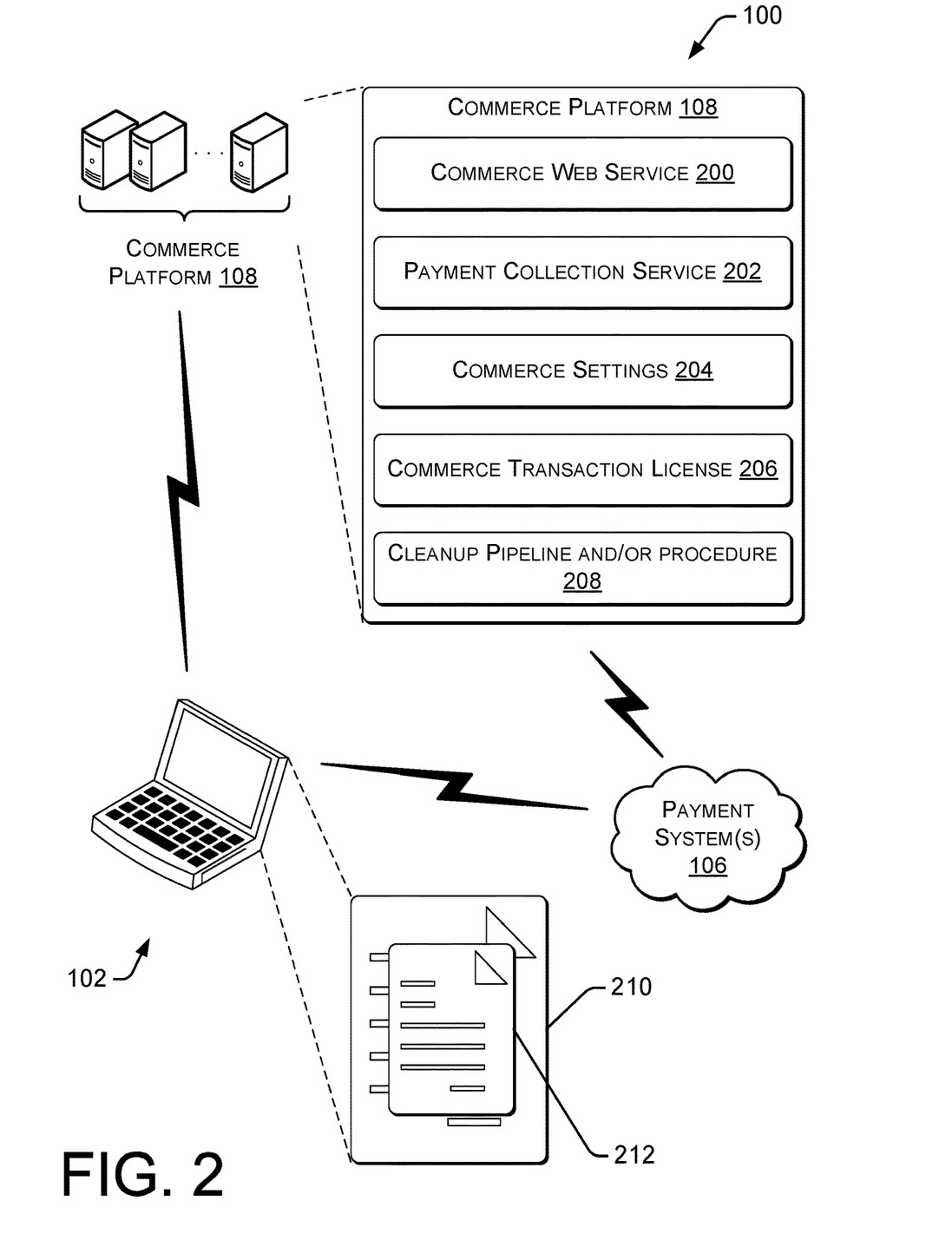
FIG. 2 is a diagram showing an example of a system for performing e-commerce payments, including example detail of a commerce platform and detail of client operation in performing an asynchronous payment.

FIG. 2 is a diagram showing another view and further example techniques of the system 100 for performing e-commerce payments. The view of FIG. 2 shows example detail of the commerce platform 108 and detail of operation of the client device 102 in the performance an asynchronous payment.

The commerce platform 108 of FIG. 2 is representative of third party services with which the example application programming interface (API) 120 (shown in FIG. 1) of the client device 102 may communicate in the course of an e-commerce transaction. In one example, the commerce platform 108 is configured to assist certain devices (e.g., those having the Windows® operating system) to make e-commerce transactions. FIG. 2 shows example structures of the commerce platform 108, which may be altered to fit the needs of any particular system within which the commerce platform is configured to operate. In the example shown, the commerce platform 108 includes a commerce web service 200, a payment collection service 202, commerce settings 204, a commercial transaction license 206 and/or a cleanup pipeline 208.

The commerce web service 200 may be configured to receive an initial call from the API 120 of the client 102 and to communicate with one or more of a plurality of payment systems 106. The payment collection service 202 may be configured to provide a user interface to the client, and in some instances to "wrap" a user interface of a payment system 106 to allow a user to enter payment information while still remaining within the environment of the commerce platform 108. The commerce settings 204 may include a repository of settings, which may allow the commerce platform to operate seamlessly with a plurality of different third party payment systems 106. The commerce transaction license 206 may be configured as a data file, database, or other data structure, and may be configured to record and/or indicate award of a license of ownership to the user after a successful e-commerce transaction. The cleanup pipeline and/or procedure 208 may be configured to handle incomplete transactions, such as if the user leaves the e-commerce application 118 prior to conclusion of the e-commerce transaction or if the user turns off the client device prior to the conclusion.

FIG. 2 shows on example of how a user interface, directed at least in part by the API 120 and/or the commerce platform 108, may "wrap" or otherwise manage a user interface configured at least in part by a payment system. In the example shown, the payment collection service (PCS) 202 has created a webpage 210 in response to the call from the API 120. The payment collection webpage 210 has wrapped a webpage 212 presented by the payment system 106. In a more general example, generic user interface elements may be used to provide the user with an experience including redirection to a webpage of a payment system without integration and/or contact between the application and the payment system. The redirection may be to a bank for transaction/purchase approval and/or to a website for approval. The generic user interface elements may be provided by the API, which may be extensible for interaction with other banks, websites and/or payment systems. Accordingly, the API 120 and/or the commerce platform 108 may exert some control over the experience of the user of the client 102. In operation, the user may enter information requested by the webpage 212 for transmission to the third party payment system 106.

Figure 3:
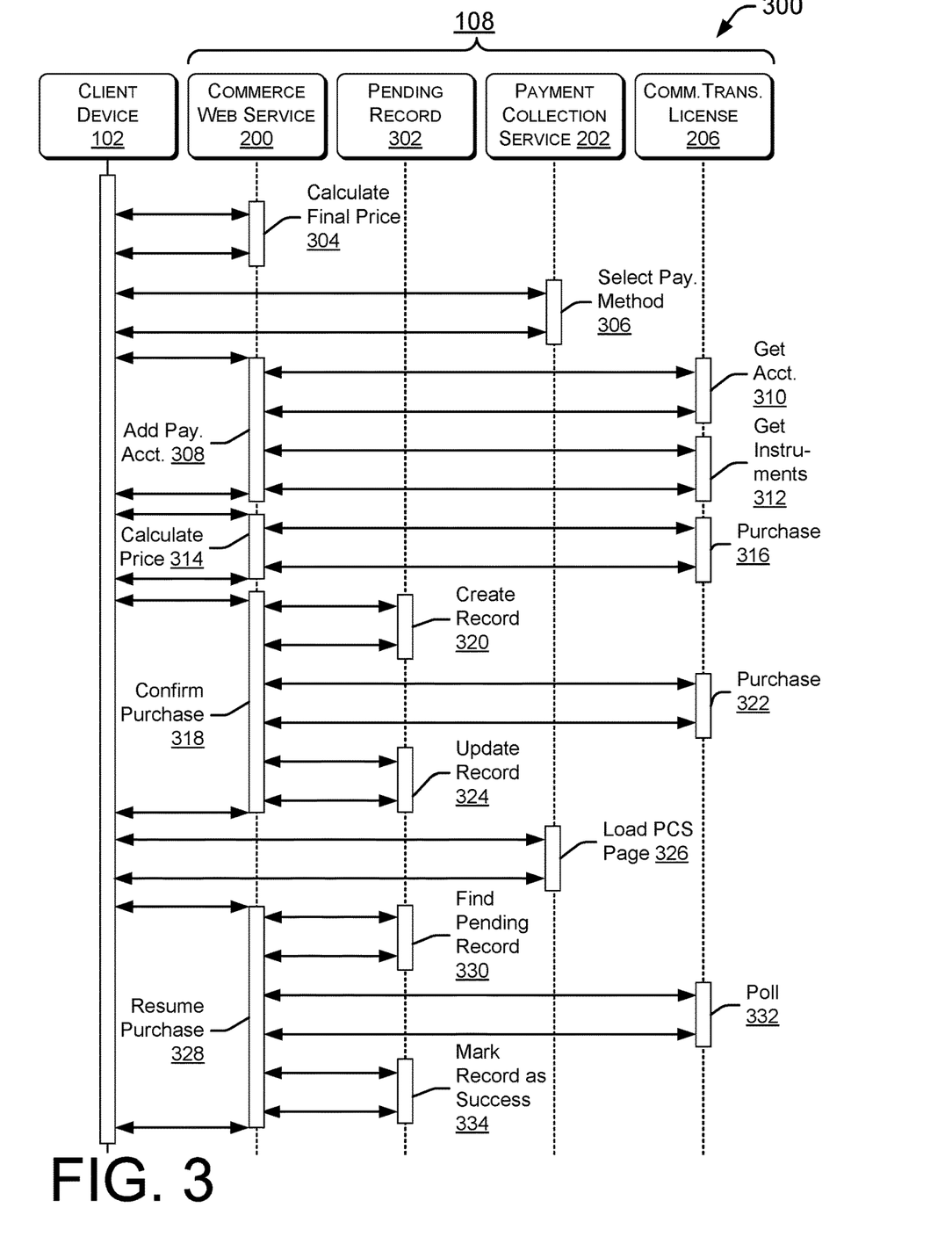
FIG. 3 is a timing and event diagram showing example of aspects of both synchronous and asynchronous transactions.

FIG. 3 is a timing and event diagram showing an example transaction 300. The activities shown in the example transaction 300 may be performed on the client device 102 and on the commerce platform 108. Activities shown as performed on the client device 102 may be performed on the e-commerce application 118. Moreover, the activities shown as performed on the commerce platform 108 for example only, and the activities could be performed in other locations within a system 100 (such as that shown in the example of FIG. 1). The example transaction 300 shows techniques utilized by both synchronous and asynchronous payment systems, and shows how failure or error in performing a synchronous transaction may result in an attempt to perform an asynchronous transaction.

In the example of FIG. 3, the activities performed on the commerce platform 108 may be performed by use of the commerce web service 200, a pending record 302, the payment collection service (PCS) 202 and/or a commerce transaction license 206. The pending record 302 may be a data structure maintained on the commerce platform 108, for example. At the client device 102, an e-commerce application (e.g., e-commerce application 118 of FIG. 1) may operate to assist a user in making an e-commerce purchase on a website.

The "calculate final price event" 304 is a specific example of a transaction that may be initiated by a call to the commerce web service 200 by the e-commerce application 118 on the client device 102. At this point, goods and/or services may have been loaded into a "shopping cart" or other device or technique for purchase. The e-commerce application 118 may call to the operating system (e.g., operating system 116 of FIG. 1) such as by making a call to a "calculate final price" procedure or similar. In the example shown, a "no account exception" may be returned, which may provide the client device a uniform resource locator (URL, i.e., webpage address). Use of the URL may be used to establish a payment method and/or payment collection service.

At "select payment method event" 306, the URL is utilized to contact a payment service, such as by operation of the payment collection service 202. Such a payment service may be associated with a credit card, money transfer system or other payment service. The service returns information to the e-commerce application 118 running on the client device 102, such as an account ID, a personal identification number, password, and/or other identifier.

At "add payment account event" 308, an account may be added for the user if an account was not identified by the "select payment method event" 306. In the example of FIG. 3, this action may be performed at least in part by the payment collection service 202. In one example, a "get account event" 310 sets up and returns an account. This action may be recorded in the commerce transaction license 206. A "get instruments event" 312 obtains documents and/or data, etc., that is required to make the purchase.

At "calculate final price event" 314, a final price of the purchase is calculated by a call to the commerce web service 200. In one example, a "purchase event" 316 may return a value of success or failure to the commerce web service 200.

At a "confirm purchase event" 318, the purchase may be confirmed. At "create record event" 320, a pending record is created. Such a record assists in scheduling the transaction and preventing its loss. At a "purchase event" 322 a status of the purchase transaction is returned. If the purchase is a synchronous credit card transaction, the status may be "completed." However, if the transaction is an asynchronous money transfer, a pending status may be returned. At "record update event" 324, a pending record is set to resume the purchase transaction. In the event of an error, it may be necessary to perform an asynchronous transaction.

At "load PCS page event" 326, payment collection webpage is loaded. In one example, a payment collection service page 212 (an example of which is shown in FIG. 2) may be provided by the payment collection service 202 to wrap a webpage of a third party payment service, which may comprise an asynchronous money transfer service.

At "resume purchase event" 328, the purchase is resumed, in the event of a failure at confirm purchase event 318. At "find pending record event" 330, the pending purchase record is found. The purchase record may have been created at "create record event" 320, as noted above. At "polling event" 332, the commerce platform 108 may respond to polls from the vendor or store, wherein the polling requests information about a status of the purchase. At "mark record as success event" 334, the record 302 is marked to indicate success or failure of the asynchronous payment process.

Example Methods

Figure 4:
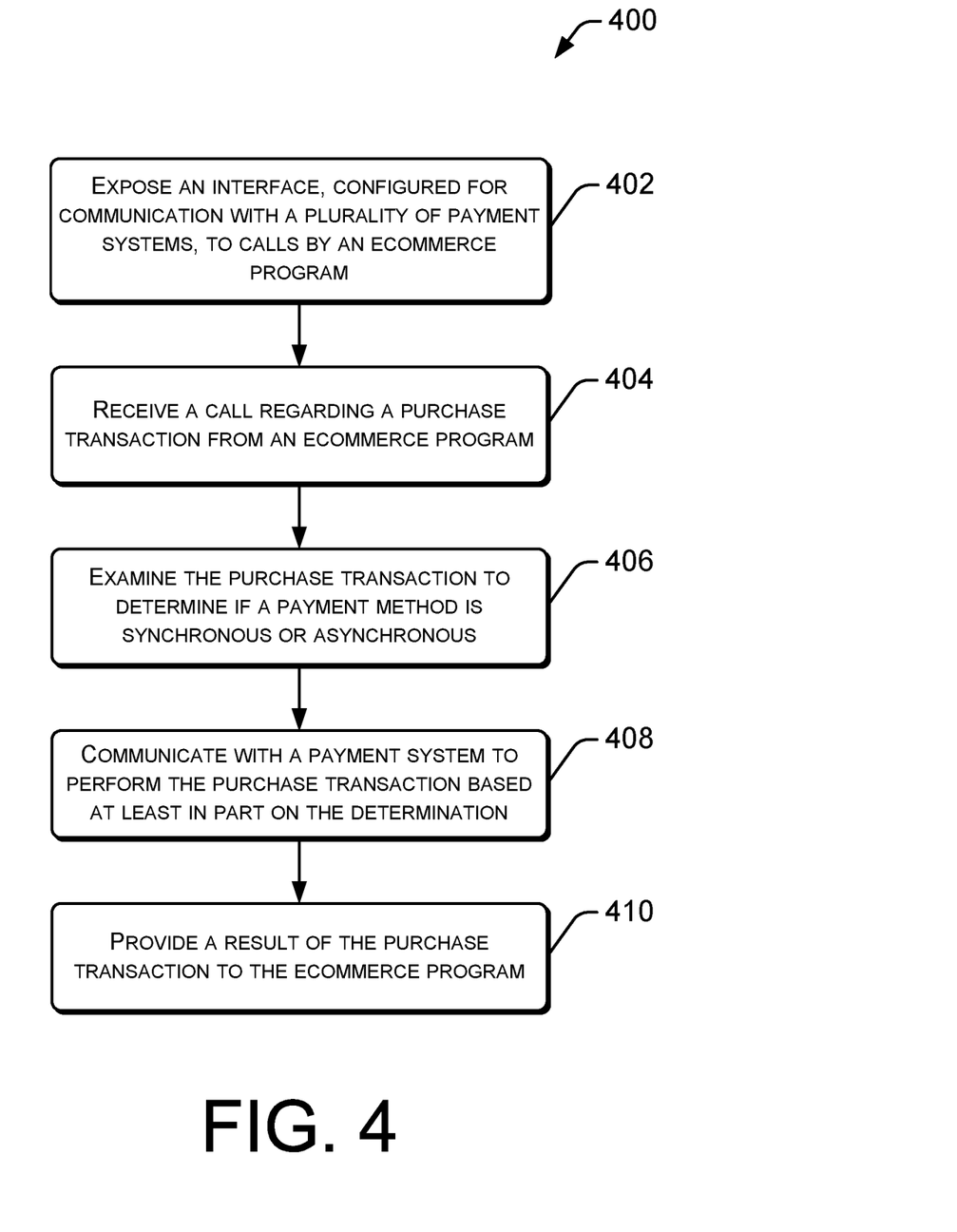
FIG. 4 is a flow diagram showing an example method to perform an e-commerce payment.

FIG. 4 is a flow diagram showing an example payment method 400 to perform an e-commerce payment. At operation 402, an interface may be exposed to allow it to be called by applications. In the example of FIG. 1, the applications programming interface (API) 120 is exposed to allow calls by the operating system 116.

At operation 404, a call is received at the interface regarding a purchase transaction from an e-commerce application. In the example of FIG. 1, the e-commerce application 118 calls the API 120 in the course of performing an e-commerce transaction.

At operation 406, the purchase transaction is examined to determine if an associated payment method is synchronous or asynchronous. In one example, the payment system and/or provider may provide an indication of whether the transaction is synchronous or asynchronous, thereby allowing the transaction to be handled appropriately. In different example systems, an examination of the transaction may be performed by the API 120 or by the commerce platform 108 to reveal if the purchase transaction is synchronous or asynchronous. In the example of FIG. 3, the "confirm purchase event" 318 may return an error, indicating that a synchronous payment method has failed, and that the payment method may be asynchronous.

At operation 408, a payment system is contacted. Communication with the payment system may result in performance of the purchase transaction. The purchase transaction may be based at least in part on the determination, at operation 406, distinguishing between synchronous and asynchronous payment methods.

At operation 410, a result of the purchase transaction is provided to the e-commerce application.

Figure 5:
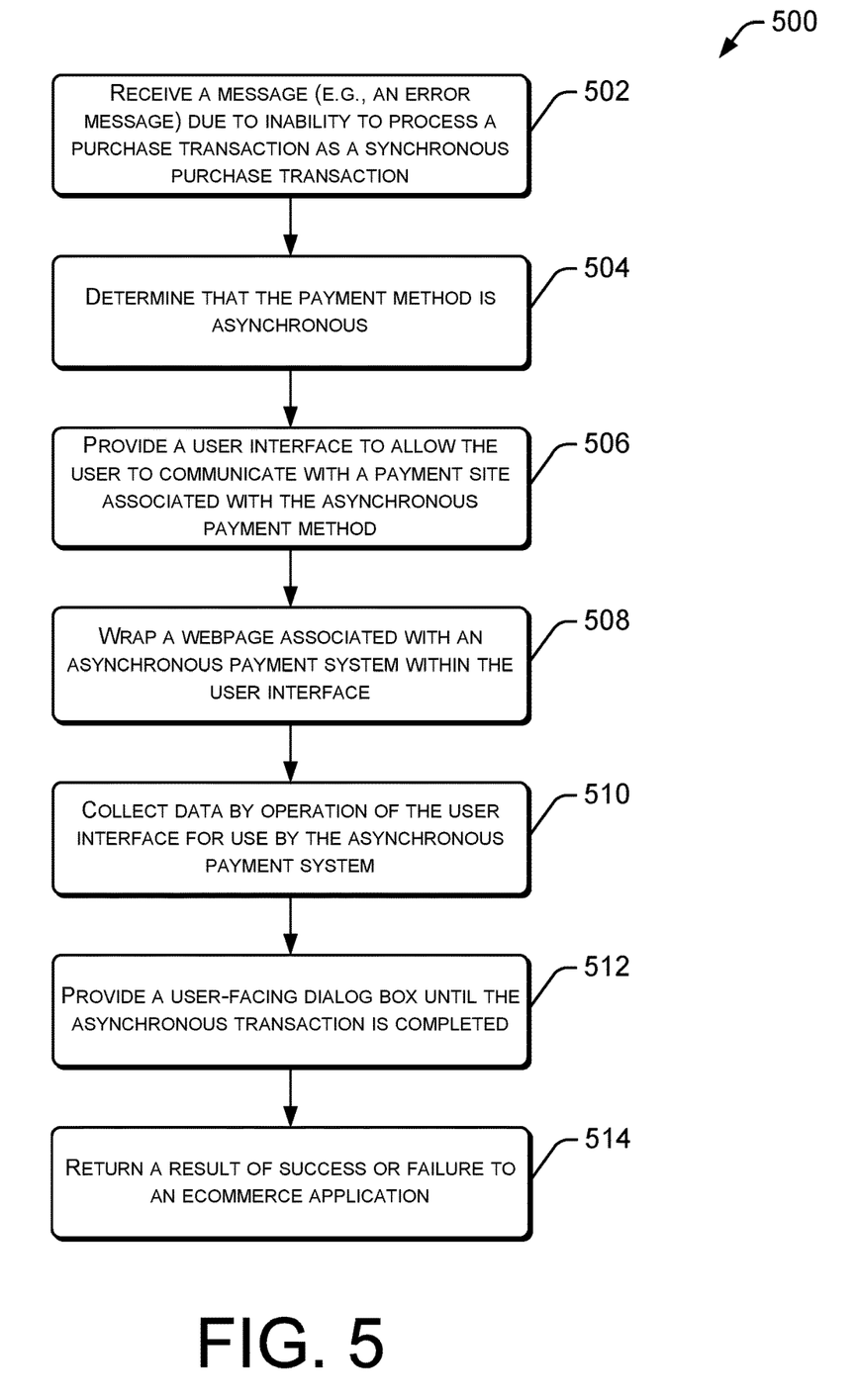
FIG. 5 is a flow diagram showing an example method to perform an asynchronous payment after failure of a synchronous payment.

FIG. 5 is a flow diagram showing an example error handling method 500 to perform an asynchronous payment after failure of a synchronous payment. At operation 502, a message (e.g., an error message) is received indicating failure of a transaction. The error may be due to an inability of a system to process a purchase transaction as a synchronous purchase transaction. In the example of FIG. 3, an error may be returned by the "confirm purchase event" 318, indicating an error due to an asynchronous payment system.

At operation 504, the payment system may be determined to be asynchronous. Asynchronous payment systems may be based on multi-step money transfer systems. In one non-limiting example, such payment systems may include those having similarity to Verified by Visa, etc. In such an example, credit cards, which are normally synchronous, may be flagged to need extra authentication, thereby becoming asynchronous.

In an example shown by operation 506, a user interface may be provided to allow the user to communicate with a payment site associated with the asynchronous payment method. In the example of FIG. 2, the payment collection webpage 210 of the payment collection service (PCS) 202 has wrapped a webpage 212 presented by the payment system 106.

At operation 508, a webpage associated with an asynchronous payment system is wrapped within a user interface, which may be provided by API 120. In the example of FIG. 3, at "load PCS page event" 326 the payment collection service webpage 212 from a vendor 104 is wrapped by the payment collection webpage 210, which may be provided by the commerce platform or the API 120.

At operation 510, operation of the user interface may collect data for use by the asynchronous payment system. The data may include user names and/or passwords to allow a money transfer from one or more accounts associated with the asynchronous payment system (e.g., one or more bank accounts used by the asynchronous system).

At operation 512, a user-facing dialog box may be provided by the API 120 until the transaction is completed. The dialog box may assist by approximating the experience the user would have during a synchronous payment process during the current asynchronous process. The dialog box may be any persistent user interface element that prevents user interaction with other portions of the application until the user has taken action on the dialog box itself. In such an example, the dialog box or other user interface element persists until the user hits a "continue" or similar button. At that point, if the transaction is still pending, the dialog box may be changed to encourage the user to "try again" or "close" the dialog box, thereby ending the transaction with failure.

At operation 514, a result of success of failure may be returned to the e-commerce application. In the example of FIG. 3, the "mark record as success event" 334 may provide such a result to the e-commerce application.

Figure 6:
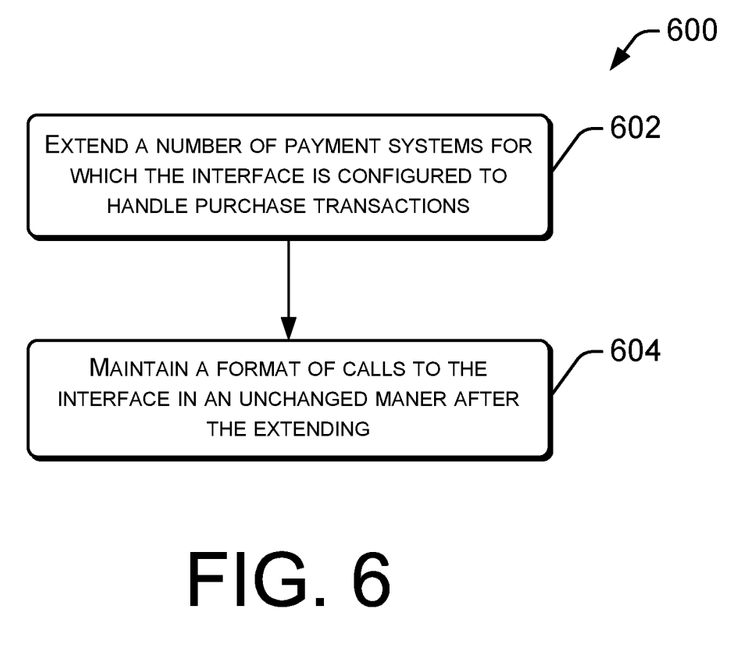
FIG. 6 is a flow diagram showing an example method to extend a number of payment systems available to e-commerce applications.

FIG. 6 is a flow diagram showing an example extensibility method 600 to extend a number of payment systems available to e-commerce applications. At operation 602, a number of payment systems for which the interface (e.g., API 120 of FIG. 1) is configured to handle purchase transactions is extended and/or increased. For example, as new payment systems, either synchronous or asynchronous, are introduced and/or incorporated for use, the API 120 may be extended to operate with each of them. Thus, the extension of the API may include additional executable statements to handle operation with each of the new payment systems.

At operation 604, a format, protocol, etc., of calls to the interface may be maintained in an unchanged manner after the extension. Thus, the same calls by the e-commerce application 118 to the API 120 may be used in an unchanged manner after the extension, while new calls may additionally be available.

Figure 7:
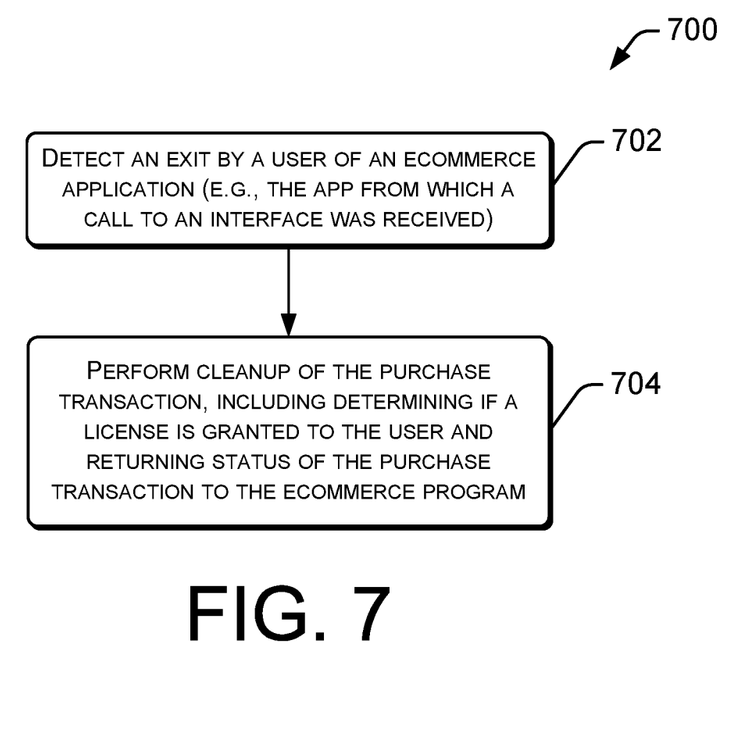
FIG. 7 is a flow diagram showing an example method to perform cleanup in the event of an e-commerce payment failure.

FIG. 7 is a flow diagram showing an example cleanup method 700 to perform cleanup in the event of an e-commerce payment failure. At operation 702, an exit by a user of an e-commerce application may be detected. For example, the user may exit the e-commerce application or may turn off the client device. This may leave any transaction in a state of uncertainty.

At operation 704, a cleanup of the purchase transaction is performed. The cleanup may determine if a license has been granted to the user, and may return a status of the purchase transaction to the e-commerce application.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device. In contrast, communication media may embody computer-readable instructions, data structures, program modules, or other data that is defined in a modulated data signal, such as in conjunction with a carrier wave. As defined herein, computer storage media does not include communication media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
receiving, from an e-commerce application, a call to an application programming interface (API) to initiate a purchase transaction;
determining, by the API examining the purchase transaction, if a payment method for the purchase transaction is synchronous or asynchronous;
communicating, using the API, with a synchronous payment system to perform the purchase transaction in response to determining that the payment method is synchronous;
extending the API with executable statements to handle asynchronous purchase transactions without a change to an interface called by the e-commerce application that would cause a redesign of the e-commerce application in response to determining that the payment method is asynchronous;
communicating, using the API, with an asynchronous payment system to perform the purchase transaction in response to determining that the payment method is asynchronous, wherein the asynchronous payment system is different from the synchronous payment system;
providing a user interface element that prevents interactions with other portions of the e-commerce application while the asynchronous payment system performs the purchase transaction until a user takes an action on the user interface element; and
providing a result of the purchase transaction to the e-commerce application.

2. The method of claim 1, wherein a payment system provides an indication whether the payment method for the purchase transaction is synchronous or asynchronous.

3. The method of claim 1, wherein a provider provides an indication whether the payment method for the purchase transaction is synchronous or asynchronous.

4. The method of claim 1, further comprising:
processing the purchase transaction as a synchronous purchase transaction; and
determining the payment method is asynchronous in response to receiving an error indicating an inability to process the purchase transaction as a synchronous purchase transaction.

5. The method of claim 1, wherein a format and a protocol of calls to the API after extending the API are unchanged.

6. The method of claim 1, further comprising:
providing a user interface to the e-commerce application, wherein the user interface is configured to wrap a webpage from a payment site associated with the asynchronous payment system while leaving a modal dialog on the e-commerce application in response to determining that the payment method for the purchase transaction is asynchronous.

7. The method of claim 1, further comprising:
providing a user interface to the e-commerce application to allow a user to communicate with a payment site associated with the asynchronous payment system in response to determining that the payment method for the purchase transaction is asynchronous; and
providing the user interface element configured to occupy the user while a store polls the e-commerce application if the result of the purchase transaction is success or failure.

8. The method of claim 1, further comprising:
extending the API with additional executable statements to operate with a new payment system in response to determining that a new payment system is introduced; and
communicating, using the API, with the new payment system to perform the purchase transaction, wherein the new payment system is synchronous or asynchronous.

9. A system, comprising:
one or more processors;
memory in electronic communication with the one or more processors; and
instructions stored in the memory, the instructions being executable by the one or more processors to:
receive, from an e-commerce application, a call to an application programming interface (API) to initiate a purchase transaction;
determine, by the API examining the purchase transaction, if a payment method for the purchase transaction is synchronous or asynchronous;
communicate, using the API, with a synchronous payment system to perform the purchase transaction in response to determining that the payment method is synchronous;
extend the API with executable statements to handle asynchronous purchase transactions without a change to an interface called by the e-commerce application that would cause a redesign of the e-commerce application in response to determining that the payment method is asynchronous;
communicate, using the API, with an asynchronous payment system to perform the purchase transaction in response to determining that the payment method is asynchronous, wherein the asynchronous payment system is different from the synchronous payment system;
provide a user interface element that prevents interactions with other portions of the e-commerce application while the asynchronous payment system performs the purchase transaction until a user takes an action on the user interface element; and
provide a result of the purchase transaction to the e-commerce application.

10. The system of claim 9, further comprising additional instructions that are executable by the one or more processors to perform an examination of the purchase transaction to determine whether the payment method for the purchase transaction is synchronous or asynchronous.

11. The system of claim 9, wherein a payment system provides an indication whether the payment method for the purchase transaction is synchronous or asynchronous.

12. The system of claim 9, wherein a provider provides an indication whether the payment method for the purchase transaction is synchronous or asynchronous.

13. The system of claim 9, further comprising additional instructions that are executable by the one or more processors to:
process the purchase transactions as a synchronous purchase transactions; and
determine the payment method to be asynchronous in response to receiving an error indicating an inability to process the purchase transaction as a synchronous purchase transaction.

14. The system of claim 9, wherein a format and a protocol of calls to the API after extending the API are unchanged.

15. The system of claim 9, further comprising additional instructions that are executable by the one or more processors to provide a user interface to the e-commerce application, wherein the user interface is configured to wrap a webpage from a payment site associated with the asynchronous payment system while leaving a modal dialog on the e-commerce application in response to determining that the payment method for the purchase transaction is asynchronous.

16. The system of claim 9, further comprising additional instructions that are executable by the one or more processors to:
provide a user interface to the e-commerce application to allow a user to communicate with a payment site associated with the asynchronous payment system in response to determining that the payment method for the purchase transaction is asynchronous; and
provide the user interface element configured to occupy the user while a store polls the e-commerce application if the result of the purchase transaction is success or failure.

17. The system of claim 9, further comprising additional instructions that are executable by the one or more processors to:
extend the API with additional executable statements to operate with a new payment system in response to determining that a new payment system is introduced; and
communicate, using the API, with the new payment system to perform the purchase transaction, wherein the new payment system is synchronous or asynchronous.

* * * * *